May 12, 1942.  E. TIMBS  2,282,685
CABLE ANCHOR
Filed March 5, 1940   2 Sheets-Sheet 1

Inventor
Edward Timbs

May 12, 1942.  E. TIMBS  2,282,685

CABLE ANCHOR

Filed March 5, 1940  2 Sheets-Sheet 2

Inventor
Edward Timbs

Patented May 12, 1942

2,282,685

UNITED STATES PATENT OFFICE 2,282,685

CABLE ANCHOR

Edward Timbs, Los Angeles, Calif., assignor to
The National Supply Company, Pittsburgh, Pa.,
a corporation of Pennsylvania Application March 5, 1940, Serial No. 322,333

3 Claims. (Cl. 24—135)

My invention relates to cable anchors, and is particularly directed to improvements in a device for securing the dead line of a cable rove between the crown block and the traveling block of a rotary drilling rig.

In present day rotary drilling operations it is customary to raise and lower the drill pipe and casing by means of a cable rove between blocks. The live end of the cable is spooled around a power driven hoisting drum and the opposite end of the cable is brought down from the crown block and "dead-ended" near the base of the derrick. The conventional practice is to anchor this dead line not at its extreme end but at an intermediate point some distance from the extreme end in order that additional cable may be available to allow for shifting of the cable through the blocks. The purpose of this shifting is to distribute the wear more uniformly over the length of the cable. The shifting operation is performed from time to time and is customarily effected by cutting off and discarding a relatively short portion of the live end which is spooled around the hoisting drum, and then respooling the new end portion. A new length corresponding to the length of the portion cut off is then admitted into the system from the dead end.

The anchor device for "dead-ending" the cable must therefore be constructed to permit movement of the line into the reeving system between blocks. A further requirement, however, is that the anchor device must maintain the dead end of the cable in operative position irrespective of the tension in the cable. Sudden or unexpected slackening of the dead line must be taken care of automatically without possibility of injury to the cable upon reapplication of tension thereto.

Accordingly, the principal object of my invention is to provide an anchor device for the dead line which is constructed in a manner to facilitate shifting of the cable and in which provision is made to prevent injury to the cable in the event of relaxation and re-application of tension thereto.

Another object is to provide a cable anchor having a snubbing surface and means associated therewith for limiting displacement of the cable therefrom when the tension in the cable is relaxed.

Another object is to provide a cable anchor having a snubbing drum provided with marginal flanges and retainer elements spaced around the periphery of the drum each extending transversely between the flanges.

Other objects and advantages of my invention will be apparent from the following detailed description of a preferred embodiment thereof as illustrated in the accompanying drawings.

Figure 1:
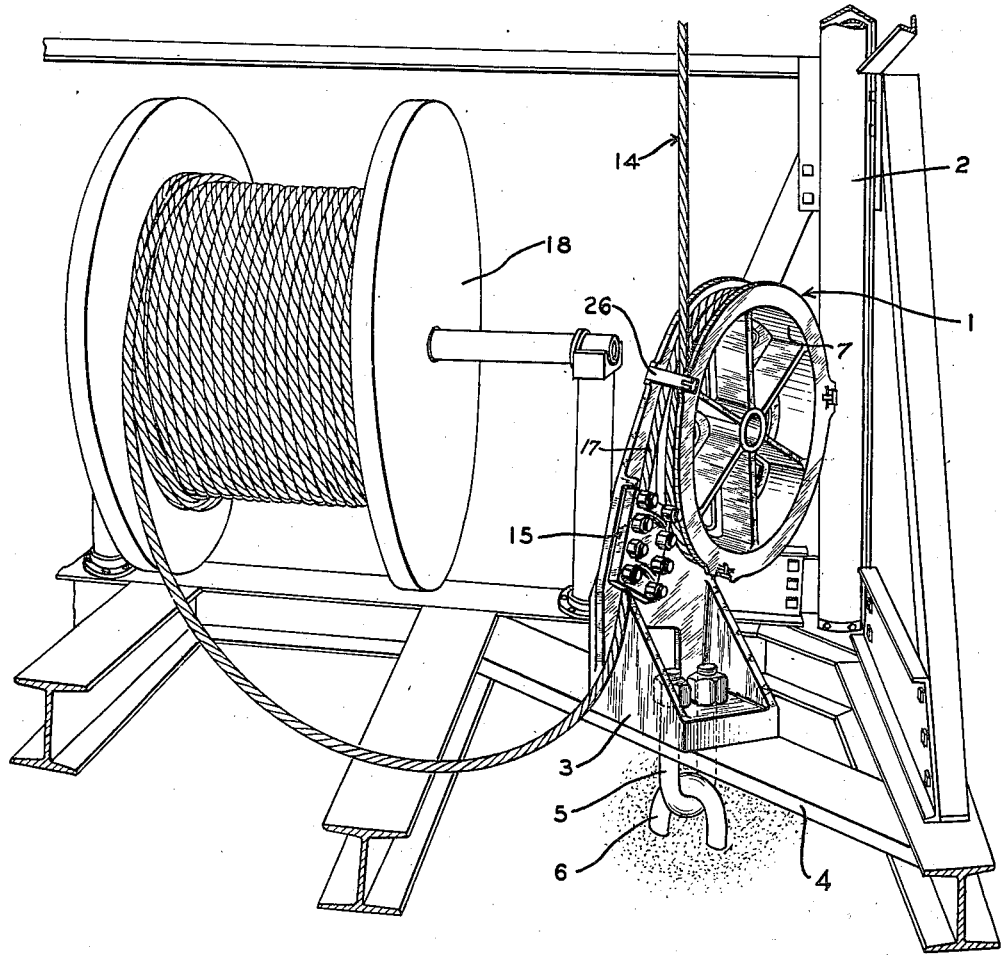
Fig. 1 is an installation view showing a preferred embodiment of my invention in operative position on a drilling rig.
Figure 6:
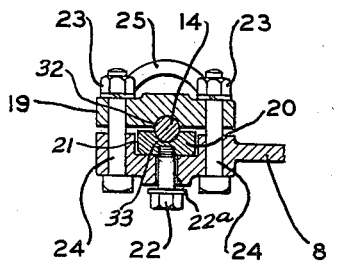
Fig. 6 is a detail sectional view taken substantially on line 6—6 as shown on Fig. 2.
Figure 3:
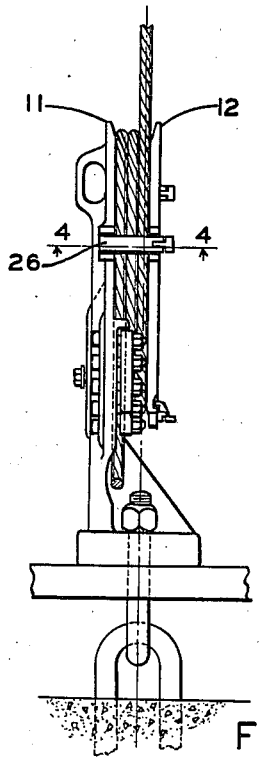
Fig. 3 is an end elevation of the device shown in Fig. 2.
Figure 2:
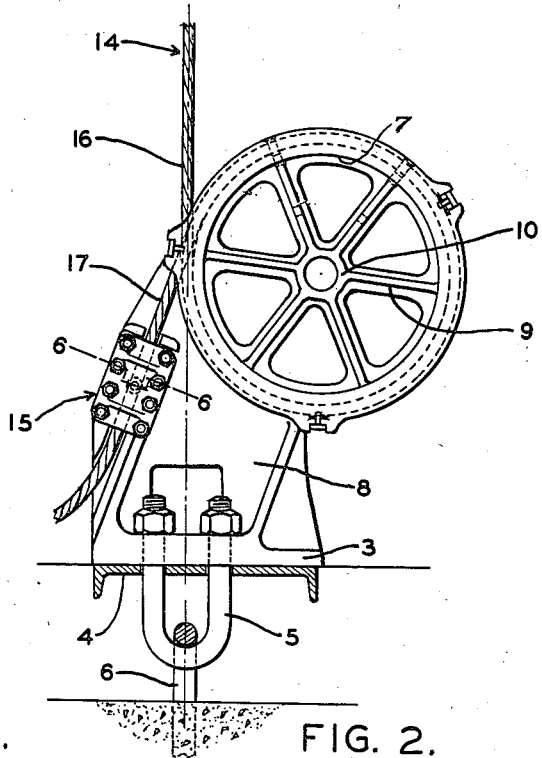
Fig. 2 is a side elevation of the cable anchor embodying my invention.

Referring to the drawings, the cable anchor generally designated 1 is adapted to be positioned at the base of a derrick 2. The cable anchor 1 is provided with a footing 3 adapted to rest on a horizontal member as, for example, a cross brace 4 near one corner of the derrick 2. A U bolt 5 extends through the cross brace 4 and footing 3 and is connected to a stationary member 6 embedded in concrete, thereby maintaining the cable anchor 1 in upright position.

A stationary snubbing drum 7 is integrally joined with the footing 3 by means of the connecting body 8. Spokes 9 radiating from a central hub 10 may be provided to lend strength and rigidity to the snubbing drum 7. Inner and outer marginal flanges 11 and 12 are formed integrally with the drum 7 and define the lateral boundaries of the snubbing surface 13. A tension member or cable 14 forms several loops around the drum 7 and then is secured to the cable anchor 1 by means of a clamping device mounted on the body 8 and generally designated 15. The taut, high-tension portion of the cable 14 above the anchor device 1 will be termed the active portion 16, and the slack, low-tension portion which is secured by the clamp 15 will be termed the inactive portion 17. The excess line on the inactive portion 17 may be conveniently stored on a reel 18 located adjacent the cable anchor 1.

The clamp 15 includes a cap 19 and a removable insert 20 mounted on the body 8 and cooperating to surround a portion of the cable 14. Grooves 32 and 33 formed in the cap 19 and insert 20 cooperate to receive the cable 14. These grooves may be formed with a smooth surface, as shown, or may be cast with indentations which match the irregular exterior surface of the cable. The insert 20 fits loosely within the recess 21 provided in the body 8 so that it is free to align itself with the cable 14. A stay bolt 22 is loosely received in bore 22a and engages the insert to prevent it from dropping out of position when the clamp is dis-assembled, but does not prevent freedom of movement of the insert 20 within the recess 21. Tightening of the nuts 23 on the bolts 24 serves to clamp the cable 14 in position between the insert 20 and the cap 19. Lifting handles 25 may be provided on the cap 19 for convenience.

The cable anchor can be made to accommodate several sizes of cable by simply changing inserts 20 and caps 19.

Figure 4:
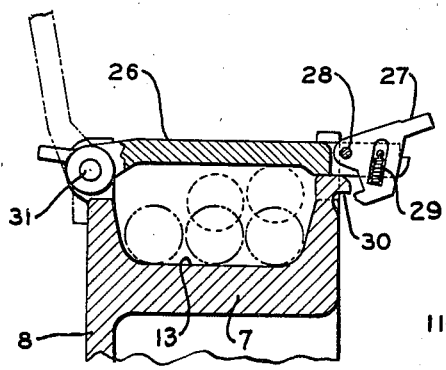
Fig. 4 is a sectional view taken substantially on line 4—4 as shown on Fig. 3.
Figure 5:
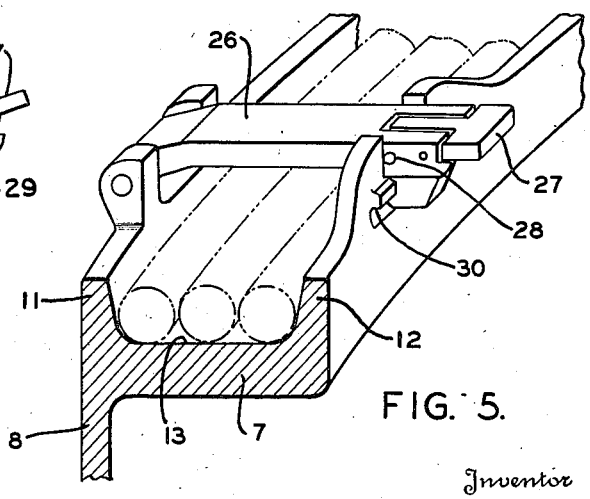
Fig. 5 is a sectional perspective view showing details of construction of one of the retainer elements.

Pivotally secured on the inner marginal flange 11 and spaced around the periphery of the drum 7 are a plurality of retainer bars 26, each of which in operative position extends transversely across the drum 7 to the flange 12 above the location of the cable loops. A latch device is provided to releasably secure each retainer bar 26 to the outer marginal flange 12. One end of each retainer bar 26 is bifurcated to receive a latch 27. A pin 28 pivotally connects the retainer bar and latch, and a compression spring 29 is provided to hold the latch 27 in engaged position under the abutment 30 formed on the outer marginal flange 12. The proportion of the parts is such that the latch 27 automatically closes when the retainer bar 26 is swung down into place. The retainer bar 26 may be swung back to an inoperative position illustrated by dotted lines in Fig. 4 by simply lifting the outer end of the latch 27. This action sequentially releases the latch 27 and swings the retainer bar 26 about its pivot pin 31.

The operation of my device is as follows: The retainer bars 26 are swung back to inoperative position to permit free access to the snubbing surface 13 of the drum 7. Several loops are then formed in the cable 14 and applied broadside to the drum 7 over the outer marginal flange 12, and the retainer bars 26 are then swung back into latched position. The clamp 15 is tightened about the cable 14. Tension is applied to the active portion 16 of the cable and this tension is almost entirely absorbed by the snubbing action around the drum 7, with the result that the tension on the clamp 15 is very low. Substantially all of the load applied by the active line 16 is taken by the footing 3 and U bolt 5, and it should be noted that the device is designed so that the line of action of the force imparted by the cable is coincident with the central axis of the U bolt 5.

As pointed out above, it is desirable from time to time to shift the cable from the storage reel 18 through the blocks toward the hoisting drum (not shown). To effect this operation, the clamp 15 is loosened to permit the cable to slide therethrough, whereupon it passes around the drum 7 and out on the active side 16. When sufficient line has been added to the system, the clamp 15 is tightened, and the line 16 is then securely anchored.

The retainer bars 26 limit the extent of displacement of the cable 14 from the snubbing surface 13 both during normal drilling operations and during the time the cable is being shifted. Slackening of the line 16 may allow the loops of cable to assume the positions shown in dotted lines in Fig. 4, but does not permit the cable to become displaced over either of the marginal flanges, or to foul on any obstructions. Re-application of tension simply moves the cable back into contact with the snubbing surface 13, and hence any possibility of injury to the cable is avoided. In this connection it should be noted that the radial distance from the snubbing surface 13 to the retainer bars 26 is too small to permit one loop from passing over another and thereby fouling the cable.

While I have shown only the preferred form of my invention, it should be understood that various changes or modifications may be made within the scope of the appended claims without departing from the spirit of the invention.

I claim:

1. In a device having a snubbing drum for anchoring a line, the combination of integral marginal flanges on said drum, a plurality of retainer elements positioned in spaced relation around the periphery of the drum and each extending transversely between said marginal flanges, said retainer elements normally having clearance with respect to the line but cooperating to limit displacement of the line radially from the drum upon slackening of the tension in the line, said retaining elements being removable from operative position to provide unobstructed access to the snubbing drum completely around its periphery, to facilitate initial installation or final removal of the line.

2. In a device having a drum for anchoring a line, the combination of marginal flanges on said drum, a plurality of retainer elements positioned in spaced relation around the periphery of the drum and extending transversely between said marginal flanges, each of said retainer elements being pivotally connected to one of said flanges and provided with latch means to form a releasable connection with the other of said flanges.

3. In an anchor device, the combination of a snubbing drum adapted to receive a plurality of loops of line, radially extending means adapted to confine the loops laterally on said drum, a retainer element associated with said means and extending entirely across the face of the drum, the clearance between the retainer element and the periphery of the drum being substantially less than twice the thickness of the line, said retainer element being removable from operative position to provide unobstructed clearance radially of the surface of the snubbing drum, to facilitate initial installation or final removal of the loops of line.

EDWARD TIMBS.